US010434367B2

(12) United States Patent
Papadourakis

(10) Patent No.: US 10,434,367 B2
(45) Date of Patent: Oct. 8, 2019

(54) MOTION CAPTURE AND ANALYSIS

(71) Applicant: NEW SPIN SPORTS LLC, Darien, IL (US)

(72) Inventor: Angelo Gregory Papadourakis, Darien, IL (US)

(*) Notice: Subject to any disclaimer, the term of this patent is extended or adjusted under 35 U.S.C. 154(b) by 188 days.

(21) Appl. No.: 15/601,812

(22) Filed: May 22, 2017

(65) Prior Publication Data
US 2017/0348561 A1 Dec. 7, 2017

Related U.S. Application Data

(63) Continuation of application No. 14/461,659, filed on Aug. 18, 2014, now Pat. No. 9,656,122, which is a (Continued)

(51) Int. Cl.
*A63B 24/00* (2006.01)
*A63B 69/00* (2006.01)
(Continued)

(52) U.S. Cl.
CPC ...... *A63B 24/0006* (2013.01); *A63B 24/0021* (2013.01); *A63B 24/0062* (2013.01);
(Continued)

(58) Field of Classification Search
CPC ............ A63B 24/0006; A63B 24/0021; A63B 24/0062; A63B 69/3632; A63B 69/3611;
(Continued)

(56) References Cited

U.S. PATENT DOCUMENTS 3,820,133 A 6/1974 Adorney et al.
3,945,646 A 3/1976 Hammond
(Continued)

FOREIGN PATENT DOCUMENTS

EP 0494749 A1 7/1992
EP WO9745176 A1 12/1997
(Continued)

OTHER PUBLICATIONS

Arvind, D.K, et al, The Speckled Golfer, Research Consortium in Speckled Computing, Scholl of Informatics, U. of Edinburgh, BodyNets 2008 p. 1-7.
(Continued)

*Primary Examiner* — Toan M Le
(74) *Attorney, Agent, or Firm* — Gavrilovich, Dodd & Lindsey, LLP

(57) ABSTRACT

Systems and methods for motion capture and analysis are described. The system may include a motion sensor unit configured to capture data associated with movement of an object. The motion sensor unit is configured to be directly or indirectly coupled to the movement object at a first location. The system also includes a processor to process the captured data to determine one or more values and to translate the data and/or values to correspond to a second location on the movement object located away from the first location. The data and/or values, including translated data and/or values, may be transmitted by wireless transmitter and displayed by a display unit.

31 Claims, 9 Drawing Sheets

US 10,434,367 B2
Page 2

Related U.S. Application Data continuation of application No. 13/972,908, filed on Aug. 22, 2013, now Pat. No. 8,831,905, which is a continuation of application No. 12/194,450, filed on Aug. 19, 2008, now Pat. No. 8,589,114.

(51) Int. Cl.
| | |
|---|---|
| *A63B 69/36* | (2006.01) |
| *G01P 15/00* | (2006.01) |
| *A63B 69/38* | (2006.01) |
| *A63B 71/06* | (2006.01) |
| *A63B 102/06* | (2015.01) |

(52) U.S. Cl.
CPC .......... *A63B 69/00* (2013.01); *A63B 69/3632* (2013.01); *G01P 15/00* (2013.01); *A63B 69/0024* (2013.01); *A63B 69/0026* (2013.01); *A63B 69/3611* (2013.01); *A63B 69/3685* (2013.01); *A63B 69/38* (2013.01); *A63B 2024/0009* (2013.01); *A63B 2024/0028* (2013.01); *A63B 2024/0068* (2013.01); *A63B 2069/0006* (2013.01); *A63B 2069/0008* (2013.01); *A63B 2071/0647* (2013.01); *A63B 2102/06* (2015.10); *A63B 2102/065* (2015.10); *A63B 2220/40* (2013.01); *A63B 2220/44* (2013.01); *A63B 2220/80* (2013.01); *A63B 2220/803* (2013.01); *A63B 2220/833* (2013.01); *A63B 2225/50* (2013.01)

(58) Field of Classification Search
CPC ... A63B 69/0026; A63B 69/024; A63B 69/00; A63B 2024/0068; A63B 2024/0028; A63B 2024/0009; A63B 2220/44; A63B 2220/40; A63B 2220/80; A63B 2220/803; A63B 2220/833; A63B 2102/06; A63B 2102/065; A63B 2071/0647; A63B 2069/0008; A63B 2069/0006; A63B 2225/50; G01P 15/00
See application file for complete search history.

(56) References Cited

U.S. PATENT DOCUMENTS

| | | | |
|---|---|---|---|
| 5,056,783 | A | 10/1991 | Matcovich et al. |
| 5,056,791 | A | 10/1991 | Poillon et al. |
| 5,062,641 | A | 11/1991 | Poillon et al. |
| 5,269,519 | A | 12/1993 | Malone |
| 5,332,225 | A | 7/1994 | Ura |
| 5,377,541 | A | 1/1995 | Patten |
| 5,447,305 | A | 9/1995 | Socci et al. |
| 5,688,183 | A | 11/1997 | Sabatino et al. |
| 5,694,340 | A | 12/1997 | Kim |
| 5,792,000 | A | 8/1998 | Weber et al. |
| 5,941,779 | A | 8/1999 | Zeiner-Gundersen |
| 6,073,086 | A | 6/2000 | Marinelli |
| 6,173,610 | B1 | 1/2001 | Pace |
| 6,227,984 | B1 | 5/2001 | Blankenship |
| 6,441,745 | B1 | 8/2002 | Gates |
| 6,474,159 | B1 | 11/2002 | Foxlin et al. |
| 6,607,450 | B1 | 8/2003 | Hackman |
| 6,821,211 | B2 | 11/2004 | Often et al. |
| 7,021,140 | B2 | 4/2006 | Perkins |
| 7,022,026 | B2 | 4/2006 | Blankenship |
| 7,140,248 | B1 | 11/2006 | Brundage |
| 7,264,554 | B2 | 9/2007 | Bentley |
| 7,329,193 | B2 | 2/2008 | Plank, Jr. |
| 7,736,242 | B2 | 6/2010 | Stites |
| 8,589,114 | B2 * | 11/2013 | Papadourakis ........ A63B 69/00 702/145 |
| 8,831,905 | B2 * | 9/2014 | Papadourakis ........ A63B 69/00 702/141 |
| 9,656,122 | B2 * | 5/2017 | Papadourakis ........ A63B 69/00 |
| 2001/0017347 | A1 | 8/2001 | Blankenship |
| 2002/0077189 | A1 | 6/2002 | Tuer et al. |
| 2004/0127304 | A1 | 7/2004 | Plank, Jr. |
| 2005/0032582 | A1 | 2/2005 | Mahajan et al. |
| 2005/0034511 | A1 | 2/2005 | Knecht |
| 2005/0054456 | A1 | 3/2005 | Gobush |
| 2005/0261073 | A1 | 11/2005 | Farrington, Jr. et al. |
| 2006/0025229 | A1 | 2/2006 | Mahajan et al. |
| 2006/0247070 | A1 | 11/2006 | Funk et al. |
| 2006/0276256 | A1 | 12/2006 | Storek |
| 2007/0135225 | A1 | 6/2007 | Nieminen et al. |
| 2007/0206837 | A1 | 9/2007 | Kirby |
| 2007/0270214 | A1 | 11/2007 | Bentley |
| 2007/0298896 | A1 | 12/2007 | Nusbaum et al. |

FOREIGN PATENT DOCUMENTS

| | | |
|---|---|---|
| GB | 2318982 A | 5/1998 |
| GB | 2430890 A | 4/2007 |
| SU | 814373 | 3/1981 |
| WO | 91/04769 | 4/1991 |
| WO | 91/06348 | 5/1991 |
| WO | 96/16706 | 6/1996 |
| WO | 00/29075 | 5/2000 |
| WO | WO0069528 A1 | 11/2000 |
| WO | 01/43837 | 6/2001 |
| WO | WO02035184 A3 | 5/2002 |
| WO | 03/024552 | 3/2003 |
| WO | 2006/081395 | 8/2006 |
| WO | 2007/019441 | 2/2007 |
| WO | 2007/112290 | 10/2007 |

OTHER PUBLICATIONS

Wright, Ian, Motion Capture in Golf, Annual Review of Golf Coaching (2008) p. 161-182.

Aylward, R., et al., A Compact, High Speed, Wearable Sensor Network for Biomotion Capture and Interactive Media, Responsive Environments, MIT Media Lab. 2007, p. 1-10.

Benbasat, A.Y., et al., An Inertial Measurement Framework for Gesture Recognition and Applications, MIT Media Lab., 2002, p. 9-20.

Bamberg, S.J. et al., Gait Analysis Using a Shoe-Integrated Wireless Sensor System, IEEE Transactions on Info. Tech. in Biomed., vol. 12, No. 4, Jul. 2008, p. 413-423.

Young, D., The Hyperbow Controller: Real-Time Dynamics Measurement of Violin Performance, Proceedings of the 2002 Conference (NIME-02) Dublin, Ireland May 2002, p. 1-6.

Hoffman, Perry J.; Letter to Michael K. Lindsey, entitled "NewSpin Golf, LLC U.S. Patent Appl. 2010/0049468 A1" Jul. 10, 2013; Northbrook, IL US; 11 pages.

Katynski, Liz; Swinging Jazz man: Terry Hashimoto vs the giants of golf (Jazz Golf Equipment Pres. Terry Hashimoto) (Cover Story); Manitoba Business; Oct. 1, 1997; 3 pages; <https://www.thefreelibrary.com/_/print/PrintArticle.aspx?id=20242967>.

Britten, Liam; PocketPro could be the best golf coach you've ever had; Tech Vibes; Jan. 10, 2011; 5 pages; <www.techvibes.com/blog/pocketpro-could-be-the-best-golf-coach-youve-e- ver-had-2011-01-10>.

Kirbyson, Geoff; Golf whiz invents swing-fix device, New high-tech clip shows your technique; Winnipeg Free Press; Mar. 14, 2010; 2 pages; <http://www.winnipegfreepress.com/local/golf-whiz-invents-swing-fix-device-87610922.html>.

Mattherw A. Argenti, Petition for Inter Partes Review of U.S. Pat. No. 9,656,122, Case IPR2019-00536, Jan. 9, 2019, PTAB, 84 pages.

Mattherw A. Argenti, Petition for Inter Partes Review of U.S. Pat. No. 8,831,905, Case IPR2019-00537, Jan. 9, 2019, PTAB, 89 pages.

Mattherw A. Argenti, Petition for Inter Partes Review of U.S. Pat. No. 8,589,114, Case IPR2019-00538, Jan. 9, 2019, PTAB, 85 pages.

Brett Pinkus, Patent Owner's Preliminary Response for Inter Partes Review of U.S. Patent No. 9,656,122, Case IPR2019-00536, Apr. 23, 2019, PTAB, 60 pages.

(56) References Cited

OTHER PUBLICATIONS

Gord Parke, Declaration of Gord Parke in Inter Partes Review of U.S. Pat. No. 9,656,122, Case IPR2019-00536, Apr. 23, 2019, PTAB, 65 pages.
Brett Pinkus, Patent Owner's Preliminary Response for Inter Partes Review of U.S. Pat. No. 3,831,905, Case IPR2019-00537, Apr. 23, 2019, PTAB, 51 pages.
Gord Parke, Declaration of Gord Parke in Inter Partes Review of U.S. Pat. No. 8,831,905, Case IPR2019-00537, Apr. 23, 2019, PTAB, 55 pages.
Brett Pinkus, Patent Owner's Preliminary Response for Inter Partes Review of U.S. Pat. No. 3,589,114, Case IPR2019-00538, Apr. 23, 2019, PTAB, 51 pages.
Gord Parke, Declaration of Gord Parke in Inter Partes Review of U.S. Pat. No. 8,589,114, Case IPR2019-00538, Apr. 23, 2019, PTAB, 55 pages.
Christopher Kaiser, Admin. Patent Judge, PTAB Decision Denying Inter Partes Review of U.S. Pat. No. 9,656,122, Case IPR2019-00536, Jul. 8, 2019, PTAB, 20 pages.
John Kenny, Admin. Patent Judge, PTAB Decision Denying Inter Partes Review of U.S. Pat. No. 3,831,905, Case IPR2019-00537, Jul. 8, 2019, PTAB, 28 pages.
Frances Ippolito, Admin. Patent Judge, PTAB Decision Denying Inter Partes Review of U.S. Pat. No. 3,589,114, Case IPR2019-00538, Jul. 8, 2019, PTAB, 31 pages.

\* cited by examiner

MOTION CAPTURE AND ANALYSIS

CROSS-REFERENCE TO RELATED APPLICATIONS

This application is a continuation of application Ser. No. 14/461,659, filed on Aug. 18, 2014 and entitled "Motion Capture and Analysis," now U.S. Pat. No. 9,656,122; which is a continuation of application Ser. No. 13/972,908, filed on Aug. 22, 2013, and entitled "Motion Capture and Analysis," now U.S. Pat. No. 8,831,905; which is a continuation of application Ser. No. 12/194,450, filed on Aug. 19, 2008 and entitled "Motion Capture and Analysis," now U.S. Pat. No. 8,589,114. The foregoing are incorporated herein by reference in their entireties.

FIELD

The present invention relates generally to computer software architecture and micro electro-mechanical devices and, more specifically, motion capture and analysis is described.

BACKGROUND

The evaluation of motion in various contexts and activities is a difficult and often problematic task using conventional solutions. Conventional solutions often have bulky, cumbersome, and inaccurate implementations that can affect the actual motion being evaluated. Further, many activities in which motion of, for example, a human body is evaluated require the use of specialized equipment that is often bulky and impractical. For example, motion evaluation of a combatant soldier wearing various types of gear and weapons may require, in conventional solutions, the use of bulky or heavy motion sensors. Conventional sensors and sensory systems may be coupled to processing units using either cumbersome wiring or heavy transmission equipment that requires a fixed and not portable system, minimizing both utility and effectiveness. As another convention example, a baseball bat may have a motion sensor that is heavy and attached to the bat, which could affect the detection and evaluation of certain motions. In other activities such as golf, motion (e.g., velocity, angle of impact of a club face against a ball, trajectory, and others) is typically not measured accurately nor easily measured using conventional solutions. As many golfers are aware, the trajectory of a golf ball depends upon the forward velocity, path, and relative club face angle of a golf club at the time of impact with the golf ball. Additionally, the ability to track and display the position and the forward velocity of the golf club through a full range of swing motion is vital to developing a successful and repeatable golf swing. While conventional techniques exist to capture motion of an object, there are various problems and limitations associated with conventional motion capture and analysis apparatus and techniques.

Limitations inherent to the conventional motion capture and analysis systems generally tend to preclude the everyday golfer from utilizing or benefitting from the training benefits imparted by such a system. For example, conventional motion capture and analysis systems tend to be complex, difficult to utilize and are not user friendly. Additionally, the conventional equipment is expensive, cumbersome and is limited in usability. Conventional equipment is not readily portable and must be used at a driving range or other training facility. Conventional equipment cannot be easily transported around a golf course, often becoming cumbersome for use throughout a round of golf. Conventional equipment lacks subjectivity and relies upon a universal standard in which to compare the user's particular swing motion. Conventional equipment does not account for variation in user's physiological characteristics.

Thus, what is needed is a solution for capturing and evaluating the swing motion of a golfer without the limitations of conventional techniques and equipment.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Figure 1A:
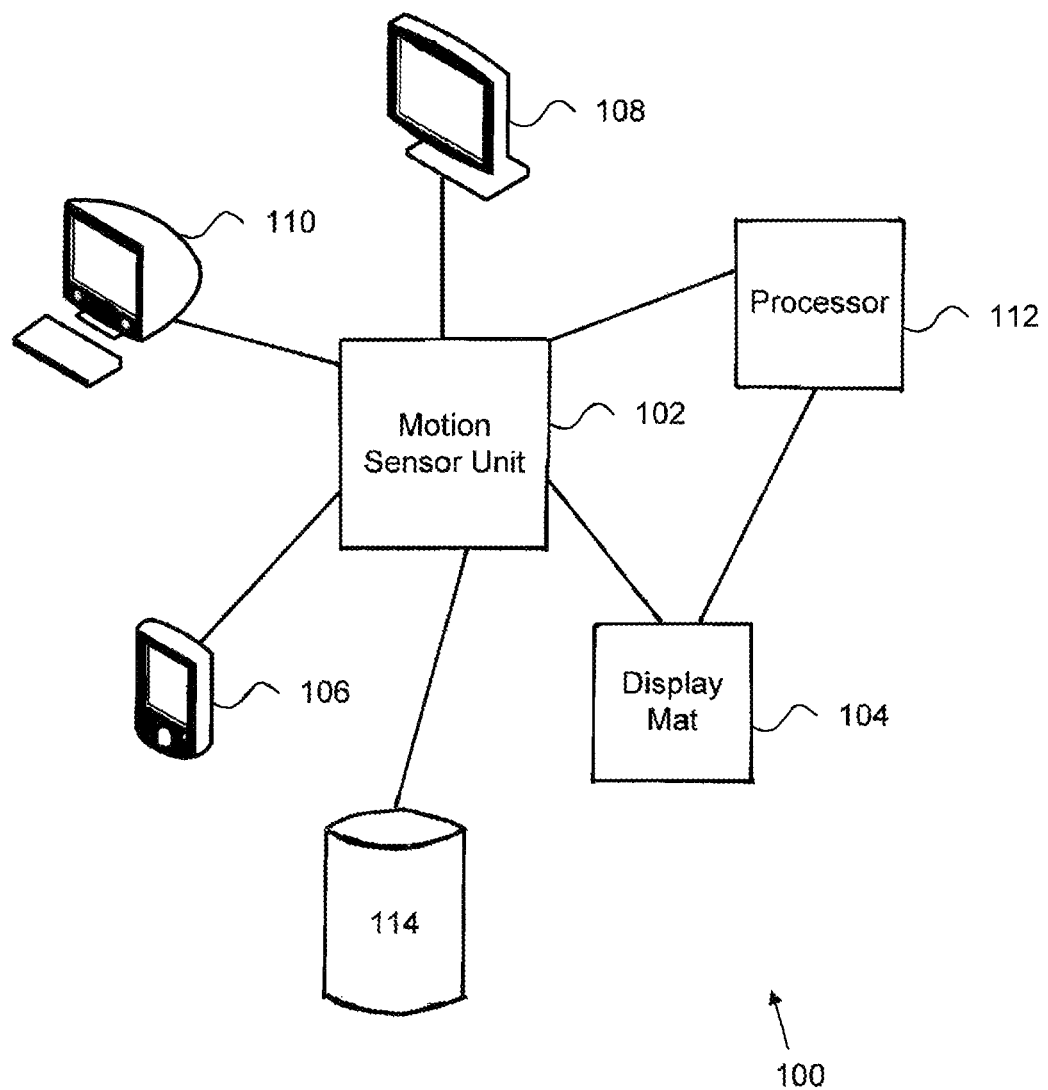
FIG. 1A illustrates an exemplary system configured to implement motion capture and analysis.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Adobe® Integrated Runtime™ (Adobe® AIR™), ActionScript™, Flex™, Lingo™ Java™, Javascript™, Ajax, Perl, Python, COBOL, Fortran, ADA, XML, MXML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

An apparatus and techniques for motion capture and analysis are described herein. By using this motion capture and analysis apparatus, a golfer may be provided a visual tool to aid in analysis and development of their golf swing. This motion capture apparatus allows a user to save their personalized best swing as a reference for future comparison. The designation of a best swing is made by the user, and is not based upon an arbitrary universal conception of what constitutes a successful or productive swing motion. In other words, a motion capture and analysis apparatus may be used to assist the practice and perfection of a repeated dynamic motion, such as a golf swing. Various alternative implementations and modifications to the examples provided may be used and are not limited to the descriptions, dimensions, or other exemplary details provided herein.

FIG. 1A illustrates an exemplary system configured to implement motion capture and analysis. Here, system 100 includes motion sensor unit 102, display mat 104, portable display 106, display 108, terminal 110, processor 112, and database 114. In some examples, motion sensor unit 102 may be coupled, directly or indirectly, to a golf club, bat, racket, or other implement that may be used in a physical activity such as golf, baseball, tennis, or the like. Motion sensor unit 102 may include various types of devices or units (e.g., software, hardware, circuitry, or a combination thereof) for motion measurement (e.g., accelerometer, gyroscope, and others) may be used to gather data associated with the motion of a given implement that is processed using system 100. Further, using processors and wireless data communication protocols and techniques, data may be transmitted from motion sensor unit 102 to display units (e.g., portable display 106, display 108, terminal 110, or others), processor 112, or devices that may be configured to use, analyze, evaluate, transform, or perform other operations on data from motion sensor unit 102. Display 108, in some examples, may be implemented using a liquid crystal display (LCD), projection tube television, digital television, or any type of analog or digital display. As an example, display 108 may receive data for display using various types of wireless, wired, optical, acoustic, or other video data transmission protocols (e.g., S-video, high definition multimedia interface (HDMI), or others). In other examples, a wireless receiving unit (not shown) may be coupled to display 108 and used to receive data from motion sensor unit 102, processor 112, display mat 104, or other elements. In still other examples, processor 112 may be implemented as an element of a wireless receiving unit (not shown) coupled to display 108 in order to process data for generating and rendering an image or video on display 108. In further examples, a wireless receiving unit (not shown) may be referred to as a sensor pod or dongle ("dongle") and, when coupled to display 108, process data received from motion sensor unit 102 in order to generate and render an image for display. Further, the above-described techniques may be used to provide data processing capabilities of data received from motion sensor unit 102 and rendered on display 108, terminal 110, or other types of displays not shown. Still further, data may be transmitted from motion sensor unit 102, received by a dongle (not shown), and processed, rendered, and displayed in real-time or substantially real-time on display 108. In other examples, system 100 and the above-described elements may be varied in design, function, structure, configuration, implementation, or other aspects and are not limited to the examples described.

Here, processor 112 may be used to process data provided by motion sensor unit 102 in order to generate a display on, for example, portable display unit 106 or display mat 104. As another example, processor 112 may be implemented in a separate device or in connection with motion sensor unit 102, display mat 104, portable display 106, display 108, terminal 110, or any other type of device including, for example, a television (TV), monitor, display, or other type of device. For example, motion sensor unit 102 may be coupled to a golf club (not shown) and, when the golf club is swung, data may be captured by motion sensor unit 102 and transmitted to processor 112 using, for example, a wireless transmitter, transceiver, or the like (not shown). As another example, processor 112 may be implemented within a dongle or other type of wireless receiver coupled to display 108. When data is received by a dongle, images or video of motion captured by motion sensor unit 102 may be recorded and/or processed to display an image or video on display 108. In other examples, processor 112 may be implemented as part of display 108 without the use of a dongle or other wireless sensor pod coupled externally to display 108. In some examples, database 114 may be implemented to store and retrieve data associated with motion (e.g., swinging motion of a golf club, bat, racket, or the like) captured by motion sensor unit 102. For example, a golfer may wish to configure processor 112 to record and store data associated with a series of swings in database 114, which may be implemented using a standalone or distributed database, repository, data warehouse, storage area network (SAN), network attached storage, or other type of data storage facility using hardware and/or software. Further, once stored, data may be retrieved from database 114, which may be implemented with one, some, or none of the other elements shown in system 100. In other words, database 114 may be implemented with processor 112 with display 108. Database 114 may also be implemented with one or more of motion sensor unit 102, display mat 104, portable display unit 106, display 108, terminal 110, processor 112, or other elements (not shown). In some examples, data from motion sensor unit 102 may be transmitted to display mat 104, portable display unit 106, display 108, or terminal 110 using one or more wireless, wired, optical, acoustic, or other types of data communication links or protocols.

Once transmitted, data may be interpreted and processed by, for example, processor 112. Likewise, processor 112 may communicate data from motion sensor unit 102 to display mat 104 or other elements provided in system 100. In some examples, display mat 104 may be configured to generate, render, and display an image on its surface. Display mat 104, in some examples, may be configured for display on a horizontal, vertical, angled, or other type of surface. For example, display mat 104 be mounted on a vertical surface and used to display an image associated with a golf club, baseball bat, cricket bat, polo mallet, or others. Display mat 104 may also be configured to lie or be mounted to a horizontal surface (e.g., floor, ground, or the like) and used to present an image associated with motion under evaluation. Data for various types of motion may be evaluated and presented using the techniques described herein.

For example, motion associated with a portion of a body (e.g., human or otherwise) may be evaluated by system 100, including detecting motion using motion sensor unit 102, which is processed by processor 112 and stored in database 114 and/or presented on display mat 104, the latter of which may be implemented using various types of displays (e.g., mats, screens, upright displays, liquid crystal displays, and others without limitation). Types of motion that may be evaluated include movement by a boxer's punching motion, a pitcher's baseball-throwing motion, a football player's kicking motion (e.g., a punt), running motion, combat or martial arts-related hand and foot motion, a dancer's foot, arm, or other body motion, and others.

As another example, when data is transmitted from motion sensor unit 102, an image of a golf club head being swung may be generated on display mat 104. Further, display mat 104 may use various types of display resolution techniques and is not limited to any particular implementation. Further, display mat 104 may be implemented using a flexible LCD, active matrix, thin film transistor (TFT), or other types of display technologies. In other example, portable display 106, display 108, and terminal 110 may be used to display data generated by motion sensor unit 102, stored and retrieved from database 114, or processed by processor 112. Links provided by and between elements 102-112 may be implemented as unidirectional, bidirectional, or other types of data communication links. In other examples, the number, type, configuration, and topology of system 100, motion sensor unit 102, display mat 104, portable display 106, display 108, terminal 110, and processor 112 may be varied and are not limited to the descriptions provided.

Figure 1B:
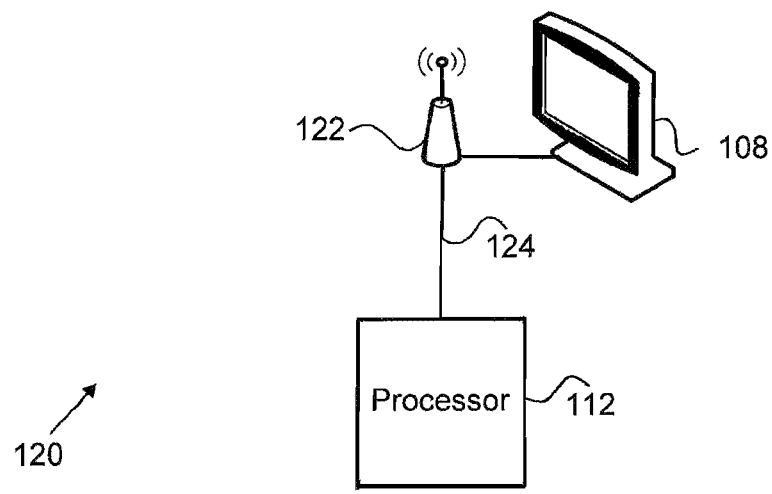
FIG. 1B illustrates an alternative exemplary system.

FIG. 1B illustrates an alternative exemplary system. Here, system 120 includes display 108, processor 112, dongle 122, and data connection 124. In some examples, dongle 122 may be implemented as a wireless transceiver to receive and/or send data from processor 112 over data connection 124, which may be implemented using wired, wireless, optical, acoustic, or other types of data communication protocols. In other examples, dongle 122 may be implemented using a wired data connection (not shown) in order to receive data for generating, rendering, and displaying an image on display 108. In still other examples, processor 112 may be implemented as part of dongle 122. Further, other elements (e.g., one or more of motion sensor unit 102, processor 112, database 114, or others) may be implemented or integrated with dongle 122. Still further, system 120 and the above-described elements may be varied in implementation, function, structure, or other aspects and are not limited to the examples provided above.

Figure 1C:
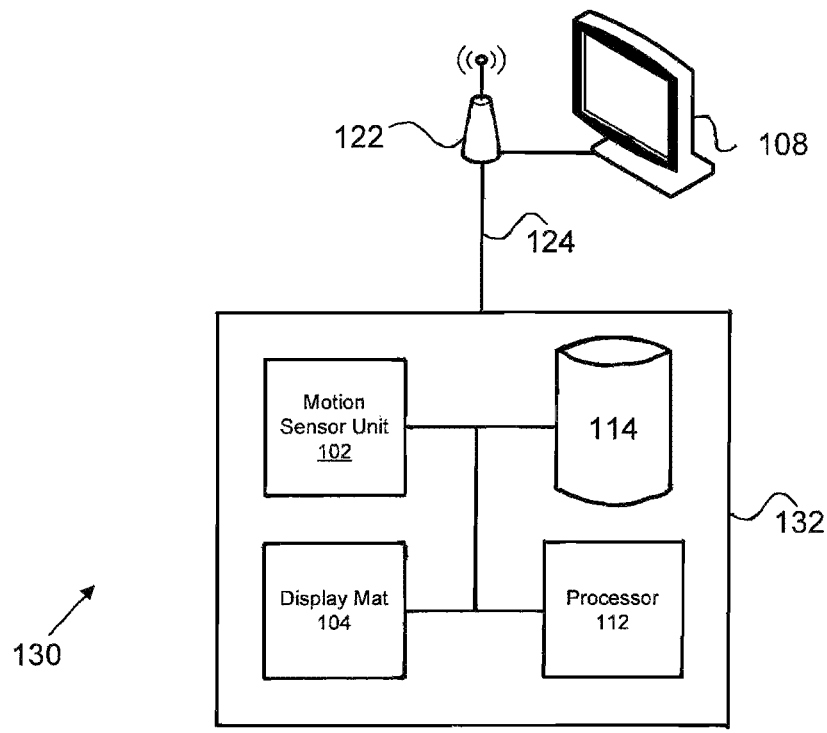
FIG. 1C illustrates another alternative exemplary system.

FIG. 1C illustrates another alternative exemplary system. Here, system 130 includes motion sensor unit 102, display mat 104, display 108, processor 112, database 114, dongle 122, and data connection 124, which may be implemented as described above or differently. Further, application 132 may include motion sensor unit 102, display mat 104, processor 112, and database 114, which may be implemented as described above or differently. Further, application 132 may be implemented using a standalone, distributed, or other type of application architecture or topology. Alternatively one or more elements (e.g., motion sensor unit 102, display mat 104, processor 112, database 114, or others) of application 132 may be implemented apart from or as part of dongle 122 or display 108. In other examples, system 130 and the above-described elements may be varied in implementation, function, or structure and are not limited to the descriptions provided.

Figure 2A:
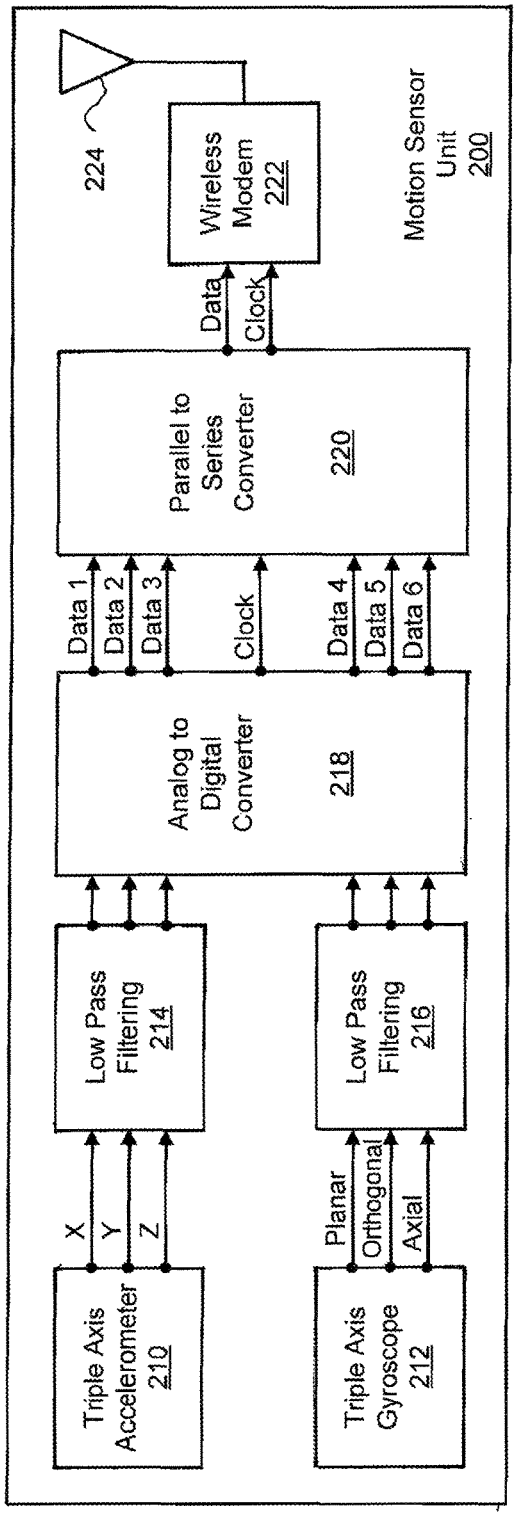
FIG. 2A illustrates an exemplary application architecture configured to implement motion capture and analysis.

FIG. 2A illustrates an exemplary application architecture configured to implement motion capture and analysis. Here, motion sensor unit 200 includes triple axis accelerometer 210, triple axis gyroscope 212, low pass filtering 214, low pass filtering 216, analog to digital converter 218, parallel to series converter 220, wireless modem 222 and wireless transceiver 224. In some examples, motion sensor unit 200 may include a micro-controller (not shown) similar to micro-controller 256 (described below in connection with FIG. 2B).

In some examples, motion sensor unit 200 may be detachably coupled to an object (e.g., golf club, tennis racket, baseball bat, softball bat, hockey stick, other sporting equipment, or others). Motion sensor unit 200 may be various sizes and shapes to accommodate a static and secure attachment to the various shapes and sizes of the detachably coupled object. Motion sensor unit 200 may have an adjustable attachment mechanism to enable one unit to accommodate various shapes and sizes of attached objects. Motion sensor unit 200 may be lightweight and easily portable. Motion sensor unit 200 may be easily attached or detached from the object by the user, without the need for specialized tools or accessories. In other examples, motion sensor unit 200 and the above-described elements may be implemented differently and are not limited to the descriptions provided.

In some examples, a power supply (not shown) such as a battery or external AC/DC converter may be coupled to motion sensor unit 200. Power supplies may be implemented as rechargeable, non-rechargeable, portable, or disposable batteries. In other examples, a battery (not shown) may be implemented as part of motion sensor unit 200, supplying power to motion sensor unit 200 and its associated components. In still other examples, a power source may be implemented as another attachment to motion sensor unit 200.

In some examples, triple axis accelerometer 210 and triple axis gyroscope 212 may be configured to measure movement of an object (e.g., golf club, tennis racket, baseball bat, softball bat, hockey stick, other sporting equipment, or others). In some examples, triple axis accelerometer 210 and triple axis gyroscope 212 may be a micro electro-mechanical system (MEMS) device. In other examples, triple axis accelerometer 210 and triple axis gyroscope 212 may be an analog or digital device. In some examples, triple axis accelerometer 210 may be configured to measure the acceleration of the object along the x-axis, y-axis and z-axis and triple axis gyroscope 212 may be configured to measure the rotational movement of the object along the planar, orthogonal and axial directions. In other examples, triple axis accelerometer 210 and triple axis gyroscope 212 may be configured differently and are not limited to the descriptions provided.

Here, triple axis accelerometer 210 communicates the data signal to low pass filtering 214 and triple axis gyroscope 212 communicates the data signal to low pass filtering 216. Further, low pass filtering 214 and low pass filtering 216 communicate the data signal to analog to digital converter 218. In some examples, analog to digital converter 218 may be configured to convert the data from an analog signal to a digital signal. Here, analog to digital converter 218 communicates the data signal to parallel to series converter 220. In some examples, parallel to series converter 220 is configured to convert the data signal from a parallel electrical signal to a series electrical signal.

Here, parallel to series converter 220 communicates the data signal to wireless modem 222. Wireless modem 222 is coupled to wireless transceiver 224 for sending and receiving signals (e.g., RF) between motion sensor unit 200 and display unit (described below in connection with FIG. 2B). In some examples, wireless transceiver 224 may be configured to send and receive communication signals using various wireless formats (e.g., ZigBee (i.e., IEEE 802.15.4 data communication protocol/standard/specification), radio frequency (RF) waves, IEEE 802.11, Bluetooth, UHF, or others).

Figure 2B:
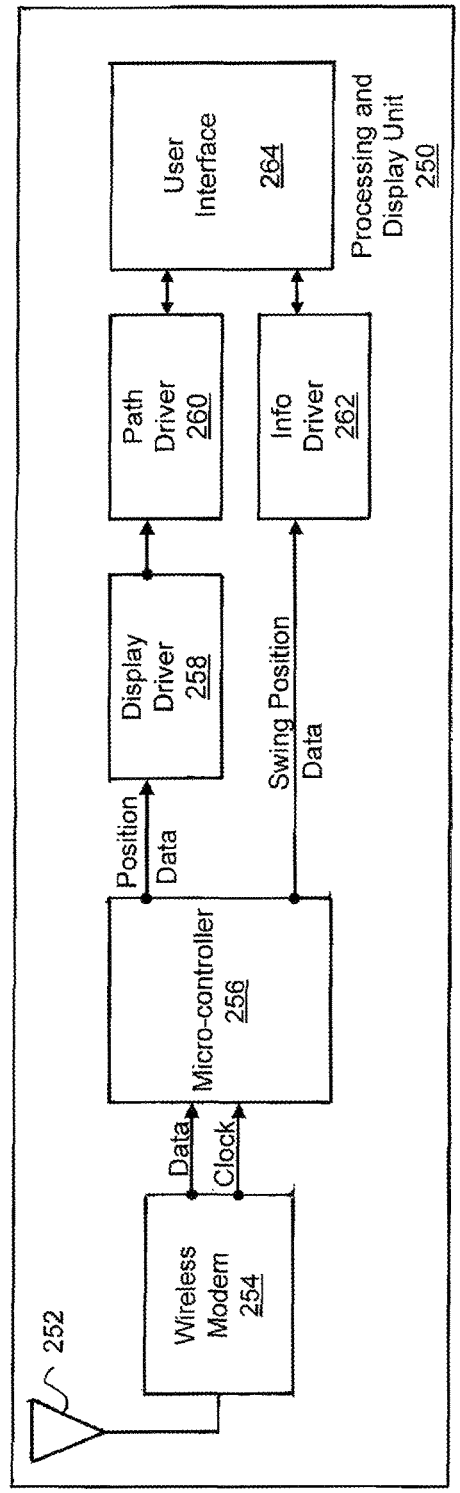
FIG. 2B further illustrates an exemplary application architecture configured to implement motion capture and analysis.

FIG. 2B further illustrates an exemplary application architecture configured to implement motion capture and analysis. Here, processing and display unit 250 includes wireless modem 254, wireless transceiver 252, micro-controller 256, display driver 258, path driver 260, info driver 262 and user interface 264. In some examples, processing and display unit 250 may be a remote device or system (e.g., display mat, portable display device, television monitor, computer, server, video recorder, or others) configured to present or display visual, graphical or numerical data measured by the motion sensor unit (described above in connection with FIG. 2A) and values associated with object movement, which are calculated using the measured data. In some examples, processing and display unit 250 may be configured to save the graphic and numerical data and values associated with a user selected reference point (i.e., "best swing") for comparison with subsequent iterations of the object movement. In some examples, processing and display unit 250 may be configured to provide an acoustic indication or response. Processing and display unit 250 may be configured with a memory device (not shown here). The memory device may be a permanent or removable memory card or hard drive.

In some examples, processing and display unit 250 presents various parameters associated with the motion of an object such as measured data (e.g., three dimensional acceleration, three dimensional rotational acceleration, maximum acceleration, or others) or calculated values (e.g., three dimensional velocity, three dimensional rotational velocity, location coordinates, maximum velocity, impact velocity, relative angle of object at point of impact, or others). Still further, processing and display unit 250 may be configured to graphically present a directional path representing the actual movement of an object and graphically indicate various significant points of reference (e.g., point of maximum velocity, or others) along the object's path of movement. In other examples, processing and display unit 250 may be configured to present or display any number of different visual, graphical or numerical parameters associated with the movement of an object and are not limited to the descriptions provided.

In some examples, processing and display unit 250 may be a display mat for use on a horizontal and flat surface, which display mat may be various sizes, shapes or dimensions. A display mat (e.g., display mat 104 (FIG. 1A)) may be configured such that the user stands on the mat while moving the object, or stands adjacent to the mat while moving the object. A display mat may also be made of a material that is durable, impact resistant and able to sustain the weight of a person. In some examples, a display mat may be made of a material that is easily rolled up and lightweight for easy portability. As an example, a display mat may be made of an array of surface mounted light emitting devices (LEDs). The display mat may be configured to present or display any or all of the visual, graphic or numerical parameters discussed above. In other examples, processing and display unit 250 may be implemented differently and is not limited to the descriptions provided.

In other examples, processing and display unit 250 may be a portable display device for handheld use. In some examples, a portable display device may be small, lightweight and easily transported by the user. In other examples, a portable display device may be various sizes, shapes or dimensions. A portable display device may also be configured to present or display any or all of the visual, graphic or numerical parameters discussed above. In other examples, processing and display unit 250 as a portable display device may be implemented differently and is not limited to the descriptions provided.

In some examples, a power supply (not shown) such as a battery or external AC/DC converter may be coupled to processing and display unit 250. Power supplies may be implemented as rechargeable, non-rechargeable, portable, or disposable batteries. In other examples, a battery (not shown) may be implemented as part of processing and display unit 250, supplying power to processing and display unit 250 and its associated components. In still other examples, a power source may be implemented as another attachment to processing and display unit 250.

Here, wireless modem 254 is coupled to wireless transceiver 252 for sending and receiving signals (e.g., RF) between processing and display unit 250 and motion sensor unit 200 (described above in connection with FIG. 2A). In some examples, wireless transceiver 252 may be configured to send and receive communication signals using various wireless formats (e.g., ZigBee, RF waves, IEEE 802.11, Bluetooth, UHF, or others).

Here, wireless modem 254 communicates the data signal to micro-controller 256. In some examples, micro-controller 256 is configured to process the measured data captured by motion sensor unit 200 (described above in connection with FIG. 2A). Micro-controller 256 may calculate values associated with movement of an object (e.g., three dimensional velocity, three dimensional rotational velocity, location coordinates, maximum velocity, impact velocity, relative angle of object at point of impact, or others) using the movement data captured by motion sensor unit 200 (described above in connection with FIG. 2A).

Here, micro-controller 256 communicates a position data signal to display driver 258 and swing position data to info driver 262. Here further, display driver 258 communicates the position data to path driver 260. Finally, path driver 260 and info driver 262 communicate the position and swing position data to and from user interface 264.

In some examples, user interface 264 may be configured to include user controls which allow user configuration of the system. User interface 264 controls may include various input mechanism and allow the user to save a selected reference point (i.e., "best swing") or select the desired display parameters. In some examples, user interface 264 may be configured to include an acoustic signal to provide an auditory indication. In other examples, user interface 264 may be configured differently and is not limited to the descriptions provided. Still further, processing and display unit 250 and the above-described elements may be implemented differently and is not limited to the descriptions or examples provided above.

Figure 3A:
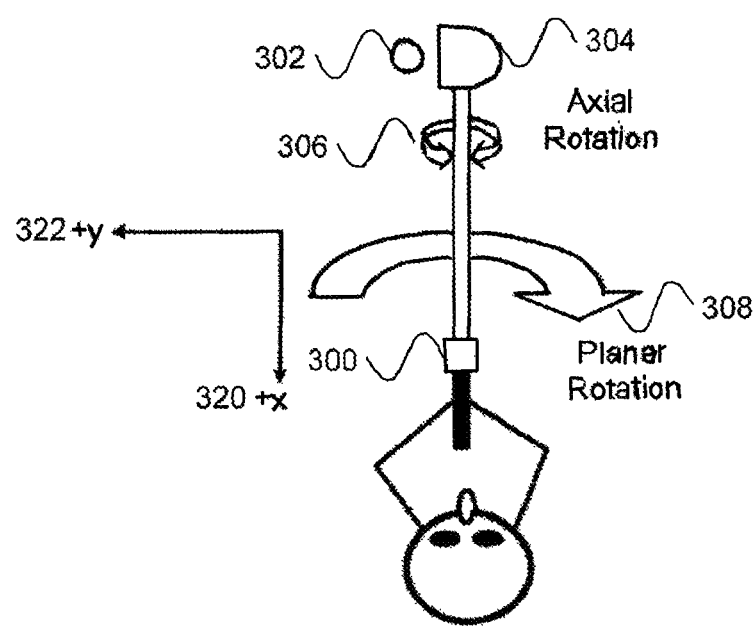
FIG. 3A illustrates an exemplary motion sensor unit.

FIG. 3A illustrates an exemplary motion sensor unit. Here, a top view of an exemplary user of the motion sensor unit is shown. In this example, motion sensor unit 300, impact object 302, movement object 304, axial rotation 306, planar rotation 308, x-axis 320 and y axis 322 are shown. Motion sensor unit 300 may be configured and implemented as described above as motion sensor unit 200 (described above in connection with FIG. 2A). As shown here, motion sensor unit 300 may be used to measure and capture axial rotation 306, planar rotation 308, x-axis acceleration along x-axis 320 and y-axis acceleration along y-axis 322. In other examples, motion sensor unit 300 may be configured to measure and capture other parameters associated with movement of an object and is not limited by the descriptions provided.

As shown here, motion sensor 300 is coupled to movement object 304, as shown here as a golf club. In other examples, movement object 304 may be a tennis racket, baseball bat, softball bat, hockey stick, other sporting equipment, or other moveable object. As shown here, movement object 304 is intended to make dynamic contact with impact object 302, as shown here as a golf ball. In other examples, impact object 302 may be a baseball, softball, hockey puck, or other moving object. In other examples, movement object 304 and impact object 302 may be different and are not limited to the descriptions provided.

Figure 3B:
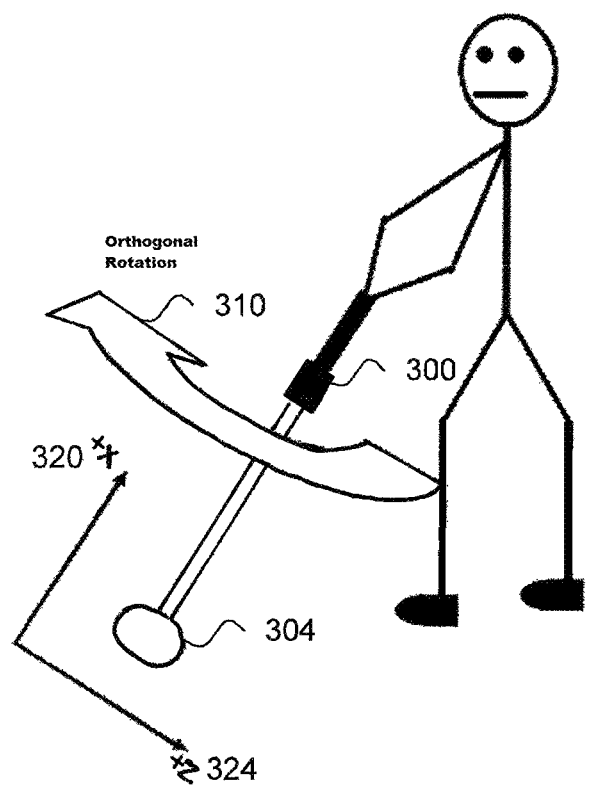
FIG. 3B illustrates a further exemplary motion sensor unit.

FIG. 3B illustrates a further exemplary motion sensor unit. Here, a side view of an exemplary user of the motion sensor unit is shown. In this example, motion sensor unit 300, movement object 304, orthogonal rotation 310, x-axis 320 and z-axis 324 are shown. Motion sensor unit 300 may be configured and implemented as described above as motion sensor unit 200 (described above in connection with FIG. 2A). As shown here, motion sensor unit 300 may be used to measure and capture orthogonal rotation 310, x-axis acceleration along x-axis 320 and z-axis acceleration along z-axis 324. In other examples, motion sensor unit 300 may be configured to measure and capture other parameters associated with movement of an object and is not limited by the descriptions provided.

As shown here, motion sensor 300 is coupled to movement object 304, as shown here as a golf club. In other examples, movement object 304 may be a tennis racket, baseball bat, softball bat, hockey stick, other sporting equipment, or other moveable object. As shown here, movement object 304 is intended to make dynamic contact with impact object (not shown). In other examples, movement object 304 may be different and is not limited to the descriptions provided.

Figure 4A:
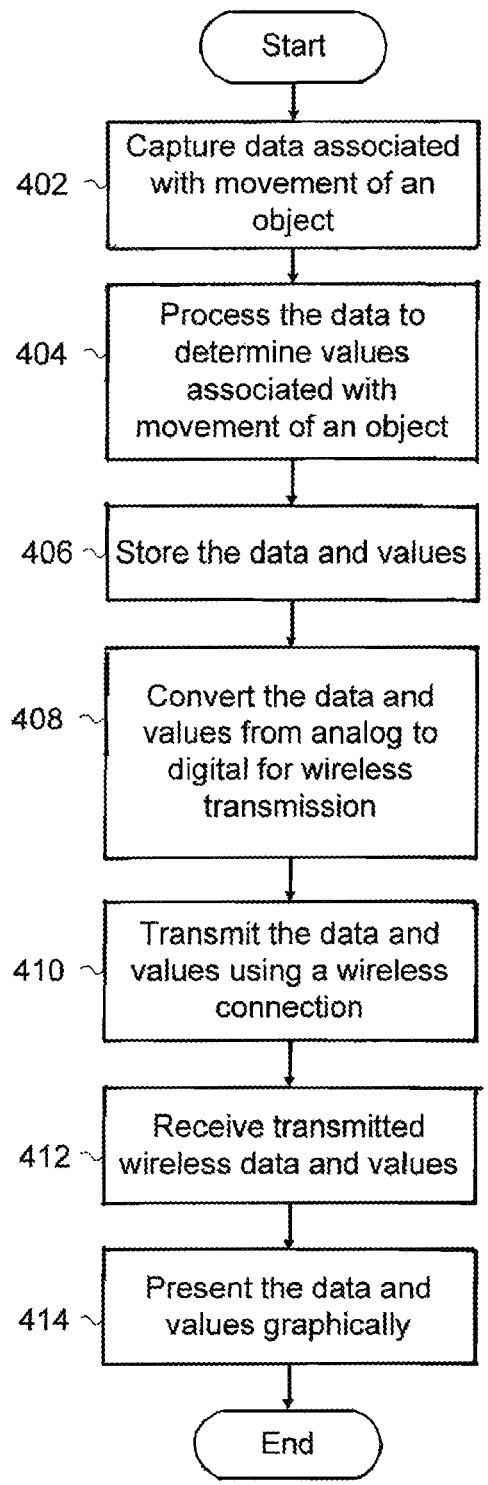
FIG. 4A illustrates an exemplary process for motion capture and analysis.

FIG. 4A illustrates an exemplary process for motion capture and analysis. In some examples, data associated with movement of an object may be captured (402). The data may be processed to determine values associated with movement of the object (404). The data and the values may be stored (406). The data and values may be converted from analog to digital for a wireless transmission (408). The data and the values may be transmitted using a wireless connection (410). Once transmitted, data and values may be received using, for example, a wireless modem (FIG. 2B) configured to modulate or demodulate transmitted data for processing and presentation on a display (e.g., display 108 (FIGS. 1A-1C) (412). The data and values may be presented graphically (414). The above-described process may be varied in function, processes and performed in any arbitrary order and is not limited to the examples shown and described.

Figure 4B:
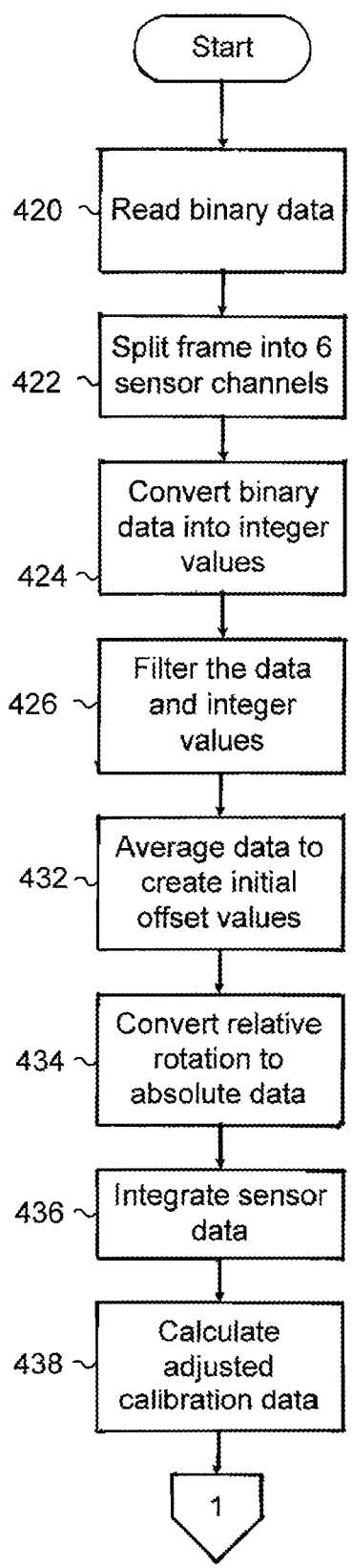
FIG. 4B and FIG. 4C illustrate an alternative exemplary process for motion capture and analysis.
Figure 4C:
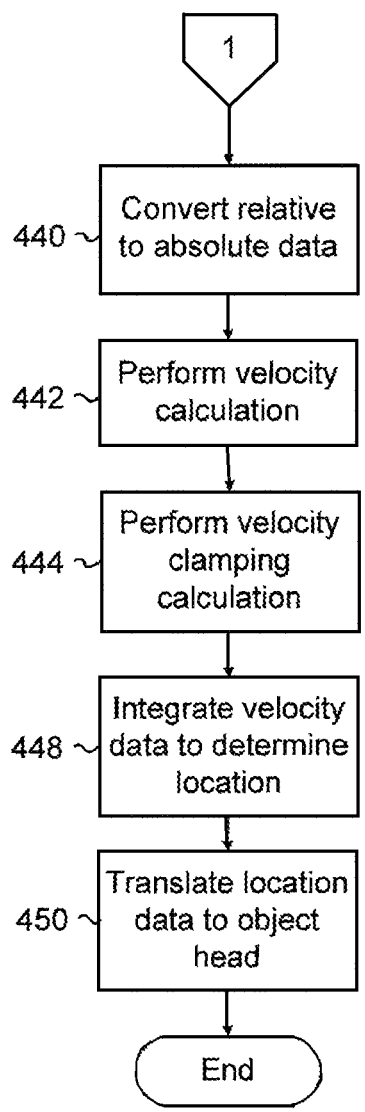

FIG. 4B and FIG. 4C illustrate an alternative exemplary process for motion capture and analysis. In some examples, binary data may be read (420). The frame may be split into 6 sensor channels (422). The binary data may be converted into integer values (424). The data and integer values may be filtered (426). Optionally, a "swing started" calculation may be performed (not shown) to determine when a swinging motion begins. A "swing started" calculation or determination may be performed, in some examples, after filtering data and integer values. Further, an optional operation for creating a lapsed time index may also be created (not shown). The data may be averaged to create initial offset values (432). Relative rotation may be converted to absolute data (434). The sensor data may be integrated (436). The adjusted calibration data may be calculated (438). Relative data may be converted to absolute data (440). A velocity calculation may be performed (442). A velocity clamping calculation may be performed (444). Optionally, a "swing end" calculation may be performed to determine when a swing motion ends or terminates (446). Velocity data may be integrated to determine location (448). Location data may be translated to object head (450). The above-described process may be varied in function, processes and performed in any arbitrary order and is not limited to the examples shown and described.

Figure 5:
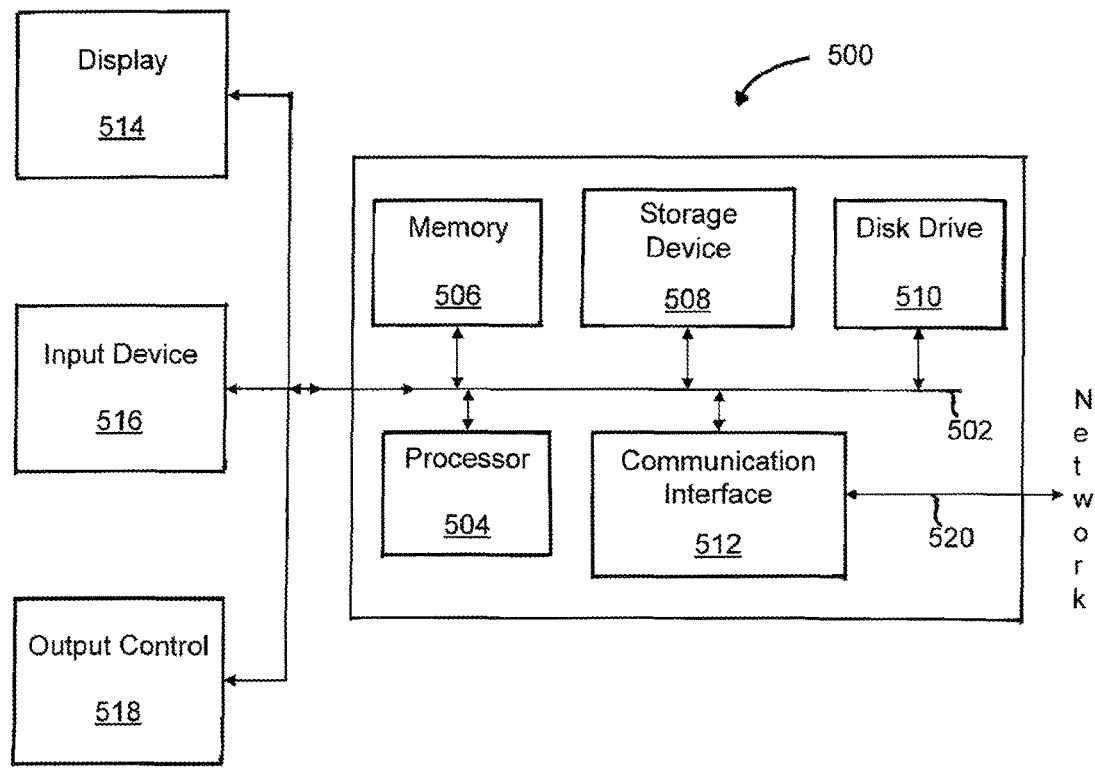
FIG. 5 illustrates an exemplary computer system suitable to implement motion capture and analysis.

FIG. 5 illustrates an exemplary computer system suitable to implement motion capture and analysis. In some examples, computer system 500 may be used to implement computer programs, applications, methods, processes, or other software to perform the above-described techniques. Computer system 500 includes a bus 502 or other communication mechanism for communicating information, which interconnects subsystems and devices, such as processor 504, system memory 506 (e.g., RAM), storage device 508 (e.g., ROM), disk drive 510 (e.g., magnetic or optical), communication interface 512 (e.g., modem or Ethernet card), display 514 (e.g., CRT or LCD), input device 516 (e.g., keyboard), and output control 518.

According to some examples, computer system 500 performs specific operations by processor 504 executing one or more sequences of one or more instructions stored in system memory 506. Such instructions may be read into system memory 506 from another computer readable medium, such as static storage device 508 or disk drive 510. In some examples, hard-wired circuitry may be used in place of or in combination with software instructions for implementation.

The term "computer readable medium" refers to any tangible medium that participates in providing instructions to processor 504 for execution. Such a medium may take many forms, including but not limited to, non-volatile media and volatile media. Non-volatile media includes, for example, optical or magnetic disks, such as disk drive 510. Volatile media includes dynamic memory, such as system memory 506.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 502 for transmitting a computer data signal.

In some examples, execution of the sequences of instructions may be performed by a single computer system 500. According to some examples, two or more computer systems 500 coupled by communication link 520 (e.g., LAN, PSTN, or wireless network) may perform the sequence of instructions in coordination with one another. Computer system 500 may transmit and receive messages, data, and instructions, including program, i.e., application code, through communication link 520 and communication interface 512. Received program code may be executed by processor 504 as it is received, and/or stored in disk drive 510, or other non-volatile storage for later execution.

Although the foregoing examples have been described in some detail for purposes of clarity of understanding, the invention is not limited to the details provided. There are many alternative ways of implementing the invention. The disclosed examples are illustrative and not restrictive.

The invention claimed is:

1. A method, comprising:
capturing data directly descriptive of movement of a movement object, the data corresponding to a first location on the movement object at or abutting a first end of the movement object, and the data being captured by an electronic motion sensor unit including one or more inertial sensors, the electronic motion sensor unit being coupled externally to an outer surface of the movement object at the first location, the movement object being configured for a physical sports or leisure activity;
processing the data with a processor to determine one or more first values directly descriptive of the movement of the movement object;
translating at least one of the first values to one or more second values corresponding to a second location on the movement object located away from the first location; and
wirelessly transmitting one or more of the data, the one or more first values, or the the one or more second values to a wireless receiver.

2. The method of claim 1, further comprising: storing both at least one of the data and at least one of the first values in a memory.

3. The method of claim 1, further comprising: wirelessly transmitting the data to the wireless receiver.

4. The method of claim 1, wherein the inertial sensors are configured to sense motion data along or about a plurality of axes.

5. The method of claim 1, further comprising:
displaying at least one of the second values at a display unit.

6. The method of claim 5, further comprising:
displaying a graph at the display unit, wherein the graph is depicts at least one of the second values.

7. The method of claim 1, wherein the second location corresponds to a location at or near a second end of the movement object.

8. The method of claim 1, wherein the data comprises acceleration data associated with the movement object.

9. The method of claim 1, wherein the data comprises angular momentum data associated with the movement object.

10. The method of claim 1, wherein the one or more first values or the second values indicate a velocity associated with the movement object.

11. The method of claim 1, wherein the one or more first values or the second values indicate a graphical path associated with the movement object.

12. The method of claim 1 wherein the one or more first values or the second values indicate a velocity associated with the movement object at a time when the movement object impacts an impact object.

13. The method of claim 1, wherein the one or more first values or the second values indicate an angle associated with the movement object at a time when the movement object impacts an impact object.

14. The method of claim 1, wherein the one or more first values or the second values indicate whether a trajectory associated with the movement object adheres to a fixed plane.

15. The method of claim 1, wherein the movement object is selected from the group consisting of a golf club, a baseball bat, a tennis racket, a hockey stick, a racquetball racquet and a squash racquet.

16. The method of claim 1, further comprising:
reading data output from an accelerometer to capture the data.

17. The method of claim 1, further comprising:
reading data output from a gyroscope to capture the data.

18. The method of claim 1, wherein the movement object is a golf club and the second location is at a club head of the golf club.

19. The method of claim 1, wherein the movement object is a bat and the second location is at a barrel of the bat.

20. The method of claim 1, wherein the movement object is a racket and the second location is at a head of the racket.

21. The method of claim 1, wherein the movement object is a racquet and the second location is at a head of the racquet.

22. The method of claim 1, wherein the movement object is a hockey stick and the second location is at a blade of the hockey stick.

23. An apparatus, comprising:
a motion sensor unit to detachably couple externally to an outer surface a movement object at a first location at or abutting a first end of the movement object, the movement object being used in a physical sport or leisure activity, the motion sensor unit including one or more inertial sensors capable of directly sensing movement of the movement object;
a processor to process data from the inertial sensors to determine one or more values directly descriptive of movement of the movement object, and to translate the data or values to correspond to a second location on the movement object located away from the first location; and
a wireless transmitter to transmit one or more of the data or at least one of the values to a wireless receiver.

24. The apparatus of claim 23, wherein the inertial sensors include an accelerometer.

25. The apparatus of claim 23, wherein the inertial sensors are configured to sense motion data along or about a plurality of axes.

26. The apparatus of claim 23, wherein the second location is at or near a second end of the movement object.

27. The apparatus of claim 23, wherein the movement object is a golf club and the second location is at a club head of the golf club.

28. The apparatus of claim 23, wherein the movement object is a bat and the second location is at a barrel of the bat.

29. The apparatus of claim 23, wherein the movement object is a racket and the second location is at a head of the racket.

30. The apparatus of claim 23, wherein the movement object is a racquet and the second location is at a head of the racquet.

31. The apparatus of claim 23, wherein the movement object is a hockey stick and the second location is at a blade of the hockey stick.

* * * * *